United States Patent
Konings et al.

(10) Patent No.: US 11,598,662 B1
(45) Date of Patent: Mar. 7, 2023

(54) CAPACITIVE FLUID LEVEL DETECTOR

(71) Applicant: Be the Change Labs, Inc., New York, NY (US)

(72) Inventors: Wouter Konings, Amsterdam (NL); Allen Simon, Bennebroek (NL); Stijn Kroeze, Amsterdam (NL); Ad van den Bemt, Breda (NL)

(73) Assignee: BE THE CHANGE LABS, INC., New York, NY (US)

( * ) Notice: Subject to any disclaimer, the term of this patent is extended or adjusted under 35 U.S.C. 154(b) by 0 days.

(21) Appl. No.: 17/117,592

(22) Filed: Dec. 10, 2020

Related U.S. Application Data

(60) Provisional application No. 62/946,029, filed on Dec. 10, 2019.

(51) Int. Cl.
*G01F 23/26* (2022.01)
*G01F 23/263* (2022.01)

(52) U.S. Cl.
CPC .......... *G01F 23/266* (2013.01); *G01F 23/265* (2013.01)

(58) Field of Classification Search
CPC .... G01F 23/266; G01F 23/265; G01F 23/263; B01L 3/52; B01L 2300/0645; B01L 3/0268
See application file for complete search history.

(56) References Cited

U.S. PATENT DOCUMENTS

| | | | |
|---|---|---|---|
| 3,844,159 A | 10/1974 | Mizutani et al. | |
| 5,592,867 A | 1/1997 | Walsh et al. | |
| 6,240,829 B1 | 6/2001 | McGarrah | |
| 6,539,797 B2* | 4/2003 | Livingston | G01F 23/266 73/304 C |
| 6,872,306 B2 | 3/2005 | Shen | |
| 9,114,345 B2 | 8/2015 | Lim et al. | |
| 9,903,748 B1* | 2/2018 | Lo | G01F 23/263 |
| 9,932,217 B2 | 4/2018 | Perrelli et al. | |
| 10,231,567 B2 | 3/2019 | Perrelli et al. | |
| 10,238,233 B2 | 3/2019 | Nuss et al. | |
| 10,371,555 B2* | 8/2019 | Philipson | G01F 23/265 |
| 10,433,666 B1* | 10/2019 | Jovanov | B65D 43/0202 |
| 2013/0112648 A1 | 5/2013 | Cohen et al. | |
| 2015/0125578 A1 | 5/2015 | Hatherell | |
| 2016/0251208 A1 | 9/2016 | Tansey, Jr. | |
| 2017/0059386 A1* | 3/2017 | Munoz | G01F 23/266 |
| 2017/0105670 A1* | 4/2017 | Holt | G01F 1/56 |
| 2017/0156540 A1 | 6/2017 | Wheatley et al. | |
| 2019/0016054 A1* | 1/2019 | Ding | G01F 25/20 |

FOREIGN PATENT DOCUMENTS

| | | |
|---|---|---|
| CN | 103690049 B | 12/2015 |
| WO | 9842612 A2 | 10/1998 |
| WO | 2016090235 A1 | 6/2016 |

* cited by examiner

*Primary Examiner* — Francis C Gray
(74) *Attorney, Agent, or Firm* — Husch Blackwell LLP

(57) ABSTRACT

A fluid level detector is provided, which has a transmitter, a receiver, and a sensing zone adjacent the transmitter and receiver. The transmitter and receiver are arranged such that when an electric field forms between the transmitter and receiver, a fringe electric field extends from the transmitter into the sensing zone. The transmitter and receiver are both on a same side of the sensing zone, and a fluid located at the sensing zone changes a measured capacitance at the transmitter and receiver system.

11 Claims, 9 Drawing Sheets

CAPACITIVE FLUID LEVEL DETECTOR

CROSS-REFERENCE TO RELATED APPLICATION

This application claims the benefit of U.S. Provisional Patent Application No. 62/946,029, filed Dec. 10, 2019, the contents of which are incorporated by reference herein in their entirety.

FIELD OF THE INVENTION

The invention relates to sensors for detecting volume or level of a fluid at a sensing location.

BACKGROUND

Existing methods of detecting fluid levels or volumes, such as an amount of fluid in a container, are often imprecise or overly intrusive.

There are many reasons that a user of a system may wish to detect a level or volume of a fluid in a container. For example, the system may be a beverage dispensing system, and a user or a system may wish to determine if the container is empty or full. If a container is empty, the user may choose to fill the container, and if the container is full, the user may wish to ensure that no additional fluid is dispensed to the container.

In such a scenario, the user may look at a water level or volume and determine manually if the container is empty or full, and may then manually choose whether to add fluid to the container. Similarly, optical sensors may be used to view the water level in the container. However, such methods may be imprecise and may fail if the container is not transparent.

A beverage dispensing system may instead weigh a container, including fluid. However, such a mechanism may also be imprecise, and may be complicated and expensive to implement.

Some beverage dispensing systems may include a floating device taking the form of a float valve or float based sensor. However, such systems require the use of a floating device inside the fluid container. Such devices may be ugly and may not be hygienic, because they can trap dirt.

Existing capacitive fluid level sensors provide strips of capacitive material that are partially submerged such that the increased capacitance of a submerged portion can be translated to a level. However, such approaches require that a container be provided with a separate capacitive sensor, and such approaches can indicate level but not volume.

There is a need to precisely and inexpensively determine an amount of fluid inside of a container.

SUMMARY

A fluid level detector is provided, which has a transmitter, a receiver, and a sensing zone adjacent the transmitter and receiver. The transmitter and receiver are arranged such that when an electric field forms between the transmitter and receiver, a fringe electric field extends from the transmitter into the sensing zone. The transmitter and receiver are both on a same side of the sensing zone, and a fluid located at the sensing zone changes a measured capacitance at the transmitter and receiver system.

DETAILED DESCRIPTION OF THE PREFERRED EMBODIMENTS

Figure 1:
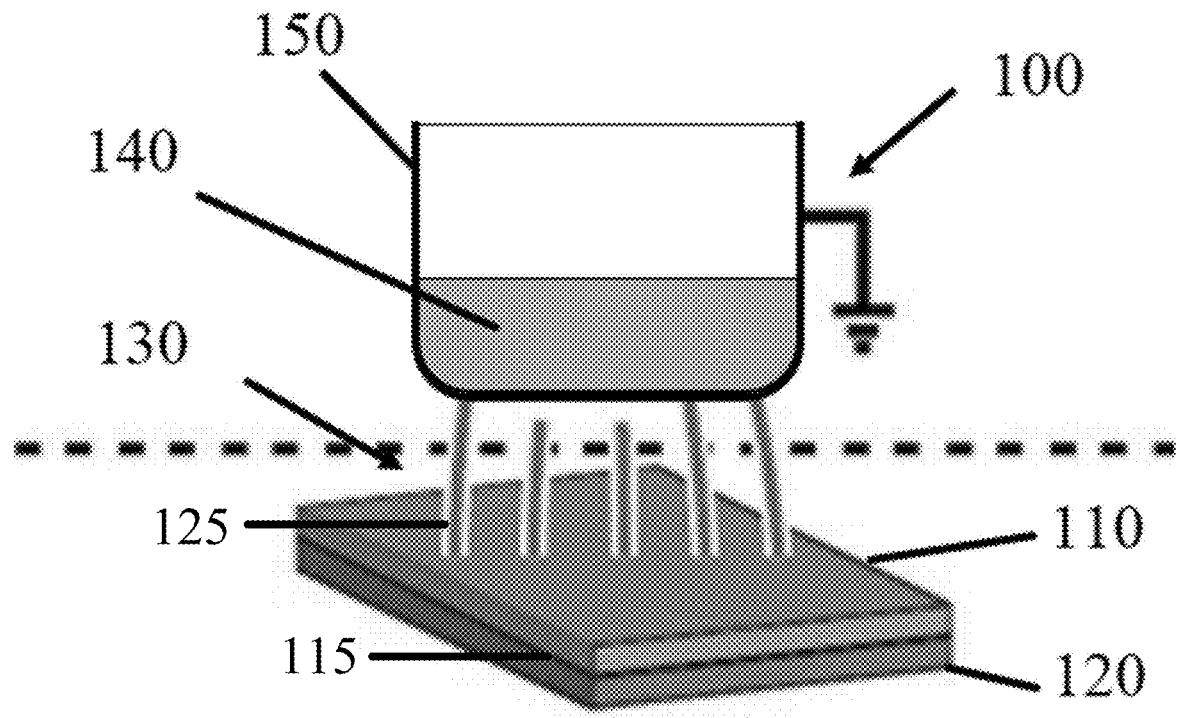
FIG. 1 shows a schematic view of a fluid level detector in accordance with this disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

A fluid level detector is provided that can detect fluid level or fluid volume through layers of materials, such as glass and plastic. Accordingly, a fluid container, such as a water bottle, can be placed at a fluid sensing zone, and an amount of fluid can be detected.

FIG. 1 shows a schematic view of a fluid level detector 100 in accordance with this disclosure. As shown, the fluid level detector 100 comprises a transmitter 110 and a receiver 120. The transmitter 110 and receiver 120 can be located within a housing, such as a base, on which a fluid to be measured may be placed.

Accordingly, the fluid level detector 100 further comprises a sensing zone 130 adjacent the transmitter 110 and receiver 120. The transmitter 110 and receiver 120 are arranged such that when an electric field 115 forms between the transmitter and receiver, a fringe electric field 125 extends from the transmitter into the sensing zone 130.

Accordingly, the transmitter 110 and receiver 120 system may be excited such that they create an electric field such that a capacitance can be measured. Both the transmitter 110 and receiver 120 are on the same side of the sensing zone 130 and typically the transmitter is located between the sensing zone and the receiver. The fringe electric field 125 then extends into the sensing zone 130, and any capacitive object placed in the sensing zone, such as fluid 140 in a container 150 shifts a measured capacitance. Accordingly, a fluid located at the sensing zone changes the capacitance measured at the transmitter receiver system.

In some embodiments, when fluid 140 is added, the capacitance measured at the transmitter 110 and receiver 120 system changes proportionally with the amount of fluid located at the sensing zone 130. Alternatively, the container 150 itself may shift the measured capacitance, and therefore the system may first be calibrated to a known container 150 such that a defined change in capacitance measured at the transmitter 110 and receiver 120 system represents a specified amount of fluid at the sensing zone 130.

In some embodiments, the container 150 may have a known capacitance such that the system may be calibrated for that particular container. In some embodiments, the container 150 may be grounded such that, instead of increasing the capacitance of the system, any fluid 140 in the container is shunted to ground, and thereby reduces the capacitance of the system. While such grounding is shown in the container 150 of FIG. 1, it will be understood that may embodiments do not provide such grounding, and that the addition of fluid would therefore be expected to increase capacitance.

In any event, where a container 150 is used, the container is typically removable, such that it may be used as a pitcher, for example, and then returned to the sensing zone after a fluid container therein is partially depleted.

As noted above, the transmitter 110 and receiver 120 can be located within a housing, such as a base, on which a fluid to be measured, or a container for such a fluid, may be placed. Accordingly, the sensing zone 130 may be located above the transmitter 110 and receiver 120.

The fluid level detector system 100 may be configured for measuring a specific fluid, such as water. Similarly, it may be configured to measure a variety of fluids, and different fluids may have different capacitance. In some embodiments, a user may identify a specific fluid to be measured, and the amount of change in capacitance measured at the transmitter 110 may be based on the fluid being measured. As such, the system may be calibrated for a particular fluid to be measured.

In some embodiments, the fluid level detector system discussed may be used in a method for detecting a fluid level and filling a container. As such, the method may provide a capacitive sensor adjacent a sensing zone 130 and may then detect the presence of a container 150 at the sensing zone. The method may then evaluate, by way of the capacitive sensor, a volume of a fluid 140 in the container 150 by evaluating the capacitance at the sensor.

If the system determines that the container 150 is not full of the fluid 140, then the system may add fluid to the container while monitoring the capacitance at the sensor. The system may then stop the addition of fluid 140 to the container 150 upon detecting a measure of capacitance at the capacitive sensor indicating a threshold amount of fluid, such as a full container.

Figure 2:
FIGS. 2-5 show use cases of a fluid level detector in accordance with this disclosure.

FIGS. 2-5 show use cases of a fluid level detector 100 in accordance with this disclosure. FIG. 2 shows an empty container 150, and as shown, a single indicator light is lit, indicating a first amount of capacitance measured at the sensor.

Figure 3:

FIG. 3 shows the same container 150 with a small amount of fluid 140 added thereto. As shown a second indicator light is now lit, indicating a second amount of capacitance measured at the sensor.

Figure 4:

FIG. 4 shows the same container 150 with additional fluid 140 added thereto. A third indicator light is now lit, indicating a third amount of capacitance measured at the sensor.

Figure 5:

FIG. 5 shows the same container 150 with additional fluid 140 added thereto. A fourth indicator light is now lit, indicating a fourth amount of capacitance measured at the sensor.

Figure 6:
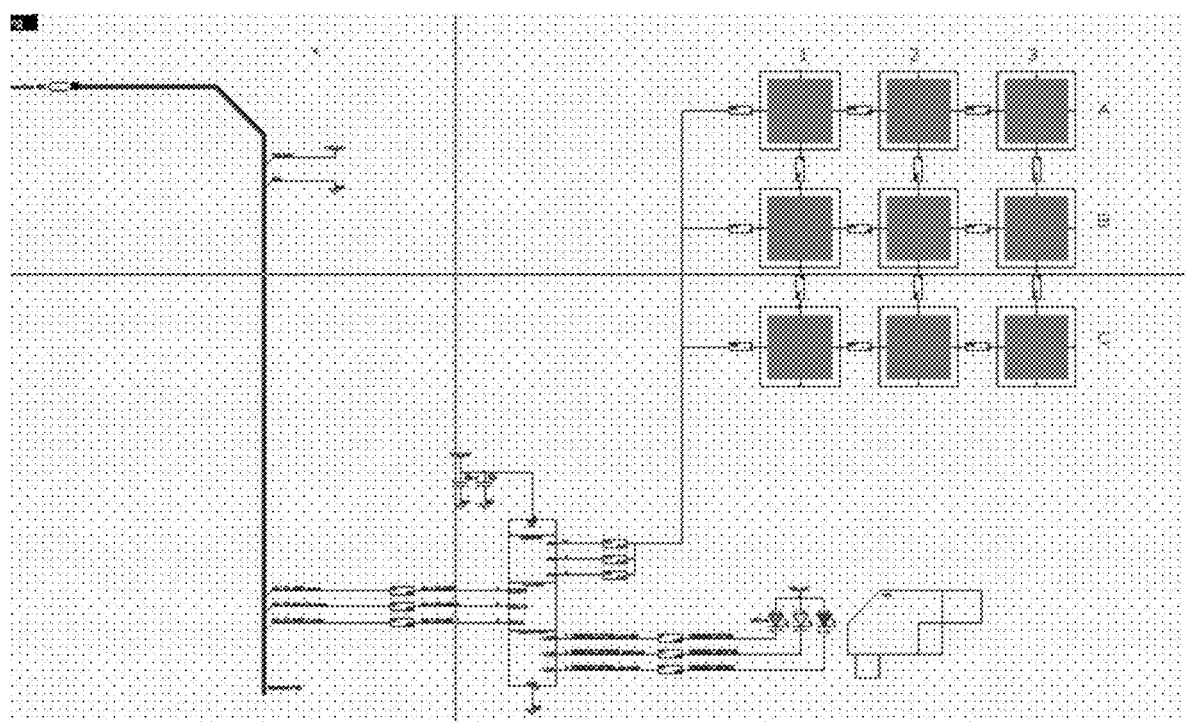
FIG. 6 shows one potential circuit diagram for use in a fluid level detector in accordance with this disclosure.

FIG. 6 shows one potential circuit diagram for use in a fluid level detector in accordance with this disclosure.

The sensor may be made from a standard FR4 PCB and the sensor may be very inexpensive. It will be understood that while a specific type of capacitive sensor is shown and described, other types of capacitive sensors may be used as well.

While the fluid level detector is discussed in terms of the addition of fluid to a container, it will also be understood that such a detector can be used to determine if a reservoir has been emptied, and to determine whether to stop a pump drawing fluid from such a reservoir.

Figure 7:
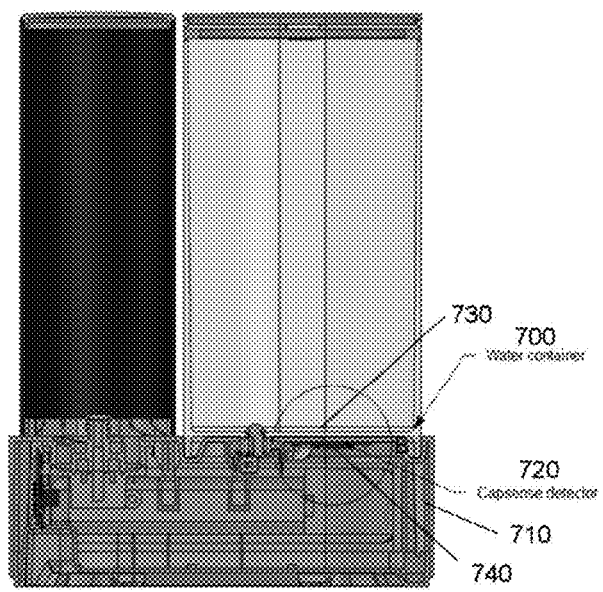
FIG. 7 shows one embodiment of a water reservoir and support incorporating a fluid level detector in accordance with this disclosure.
Figure 8:
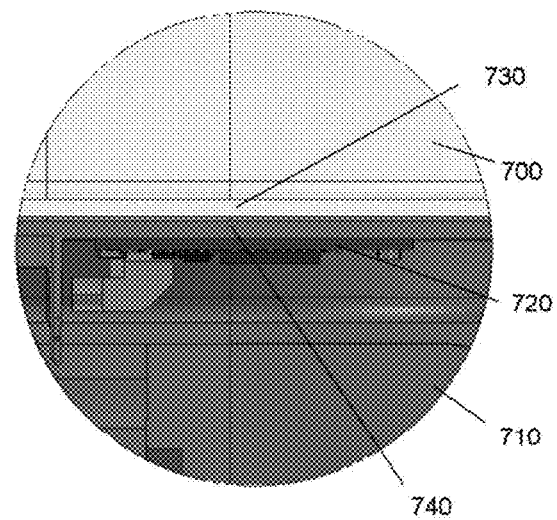
FIG. 8 shows an enlarged view of a fluid level detector in the context of the water reservoir and support of FIG. 7.

FIG. 7 shows one embodiment of a water reservoir 700 and support 710 incorporating a fluid level detector 720 in accordance with this disclosure. FIG. 8 shows an enlarged view of a fluid level detector 720 in the context of the water reservoir 700 and support 710 of FIG. 7.

During use, when a water level is to be detected in the water reservoir 700 by the fluid level detector 720 located in the support 710, the distance between water in the reservoir and the fluid level detector should be kept constant. Further, because a varied distance can affect readings at the fluid level detector 720, such distance should be kept consistent across multiple uses. Accordingly, when the reservoir 700 is removable from the support 710 containing the fluid level detector 720, a connection between the reservoir and the support should securely locate the reservoir and be repeatable. As shown, a bottom surface 730 of the reservoir 700 is positioned against an upper surface 740 of the support 710, and the reservoir is provided with a boundary extension 750 to ensure consistent locating of the reservoir.

Further, distance between a fluid to be detected in the reservoir 700 and the fluid level detector 720 should be minimized, and any air between the two should be minimized. As such, when located in the support 710, the bottom surface 730 of the reservoir 700 is positioned directly adjacent the upper surface 740 of the support 710, and the fluid level detector 720 is located within a housing of the support 710 adjacent to or fixed to the upper surface. Accordingly, only the upper surface 740 of the support and the bottom surface 730 of the reservoir appear between the fluid and the fluid level detector 720, and devices and systems implementing the described detectors can then be calibrated for such surfaces.

Figure 9:
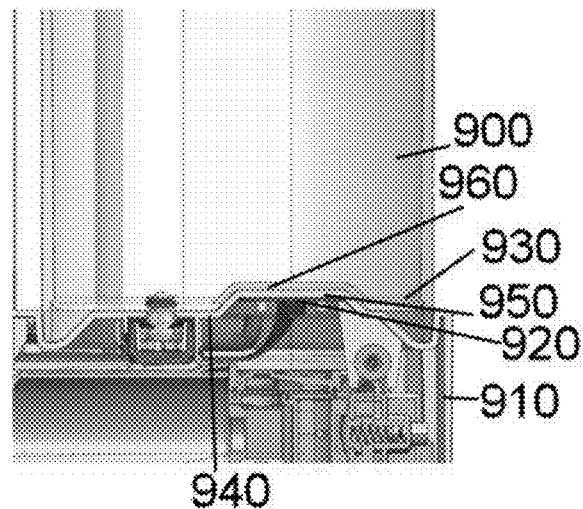
FIG. 9 shows a second embodiment of a water reservoir and support incorporating a fluid level detector in accordance with this disclosure.

FIG. 9 shows a second embodiment of a water reservoir 900 and support 910 incorporating a fluid level detector 920 in accordance with this disclosure. As shown, the embodiment is similar to that shown and discussed above with respect to FIGS. 7 and 8. However, the embodiment shown in FIG. 9 has been modified such that the fluid level detector 920 is located higher than an upper surface 940 of the support 910. This is done by providing a protruding section 950 of the upper surface 940 of the support 910 and providing a corresponding raised section 960 of the bottom surface 730 of the reservoir 900 into which the protruding section 950 can nest.

As shown, the fluid level detector 920 is then located against an upper surface of the protruding section 950, and can therefore be positioned within the raised section 960 of the bottom surface 930 of the reservoir 900. This approach locates the fluid level detector 920 closer to more of the fluid being detected while simultaneously more securely locating the reservoir 900 in relation to the fluid level detector 920 during use.

As noted above, while the method discussed is generally provided for filling a container with fluid, the method can be modified to detect fluid being drained from a container. As such, when fluid is dispensed from the reservoirs 700, 900 discussed, a fluid level in the reservoir is reduced and detected. When the fluid level is detected to be below a critical level, the fluid level detector 720, 920 may indicate as such to the system. Such an alert can be used to tell a user to refill the reservoir or stop a pump from further pumping the fluid and thereby risk running dry.

Figure 10A:
FIGS. 10A and 10B show a circuit diagram for use in a fluid level detector in accordance with this disclosure from a sensor side and component side respectively.
Figure 10B:
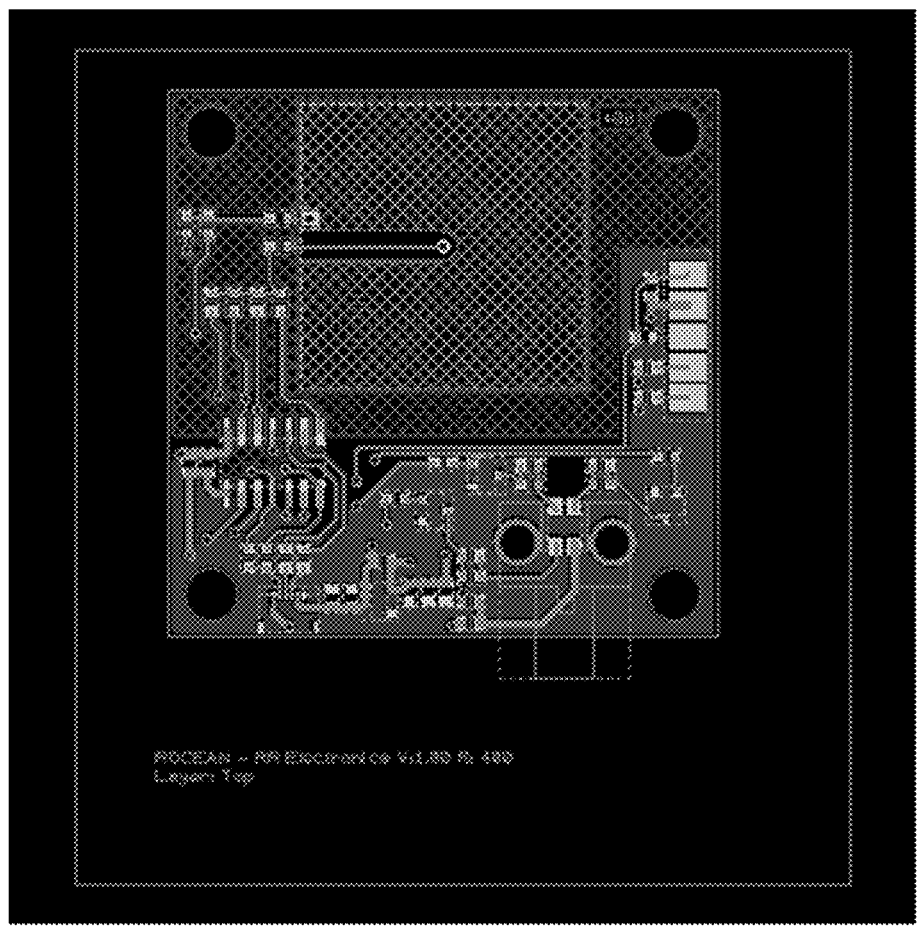

FIGS. 10A and 10B show a circuit diagram for use in a fluid level detector in accordance with this disclosure from a sensor side and component side respectively.

The fluid level detector shown is based on self-capacitance. This means only one pad is typically needed for such a sensor. The sensor can detect if fluid, such as water, is present in a container, such as a glass or plastic container, and if so, how much fluid is present.

The sensor shown is surrounded by an active guard. The guard makes the sensor less susceptible to noise, and the sensor is most sensitive on one side, and typically, straight upwards from the sensor. The sensor may be formed from surface mounted parts mounted on the non-sensor side of the board. This allows the board to be mounted in an airtight, or nearly airtight manner, to an upper surface 740, or within a protruding section 950, of a support 710, 910.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A fluid level detector comprising:
   a transmitter;
   a receiver;
   a sensing zone adjacent the transmitter and receiver;
   wherein the transmitter and receiver are arranged such that, when an electric field forms between the transmitter and receiver, a fringe electric field extends from the transmitter into the sensing zone,
   wherein the transmitter and receiver are both on a same side of the sensing zone, and
   wherein a fluid located at the sensing zone changes a measured capacitance at the transmitter and receiver system.

2. The fluid level detector of claim 1, wherein the capacitance measured at the transmitter and receiver system changes proportionally with an amount of fluid located at the sensing zone.

3. The fluid level detector of claim 1, wherein the capacitance of the system increases when fluid is added at the sensing zone.

4. The fluid level detector of claim 1 further comprising a container at the sensing zone for retaining fluid to be measured.

5. The fluid level detector of claim 4 wherein the container is removable.

6. The fluid level detector of claim 4, wherein the container is grounded such that any fluid added to the container is shunted to ground, and wherein the capacitance measured at the system decreases when fluid is added to the container.

7. The fluid level detector of claim 1, wherein a defined change in the capacitance measured at the transmitter and receiver system represents an amount of fluid at the sensing zone.

8. The fluid level detector system of claim 1, wherein the sensing zone is located above the transmitter and receiver.

9. The fluid level detector system of claim 8, wherein the transmitter is located between the receiver and the sensing zone.

10. The fluid level detector system of claim 1, wherein the amount of change in the capacitance measured at the transmitter and receiver system is based on the fluid being detected.

11. A method for detecting a fluid level, the method providing:
   providing a capacitive sensor adjacent a sensing zone;
   detecting the presence of a container at the sensing zone;
   evaluating a volume of a fluid in the container by evaluating the capacitance at the sensor;
   determining that the container is not full of the fluid;
   adding fluid to the container while monitoring the capacitance at the sensor; and
   stopping the addition of fluid to the container upon detecting a measure of capacitance at the capacitive sensor indicating a threshold amount of the fluid.

* * * * *